United States Patent
Benjey

(10) Patent No.: US 7,896,022 B2
(45) Date of Patent: Mar. 1, 2011

(54) ON-BOARD REFUELING VAPOR RECOVERY SYSTEM WITH VENT LINE CHECK VALVE

(75) Inventor: Robert P. Benjey, Dexter, MI (US)

(73) Assignee: Eaton Corporation, Cleveland, OH (US)

( * ) Notice: Subject to any disclaimer, the term of this patent is extended or adjusted under 35 U.S.C. 154(b) by 808 days.

(21) Appl. No.: 11/810,664

(22) Filed: Jun. 6, 2007

(65) Prior Publication Data
US 2007/0289633 A1 Dec. 20, 2007

Related U.S. Application Data

(60) Provisional application No. 60/811,512, filed on Jun. 7, 2006.

(51) Int. Cl.
*F16K 24/04* (2006.01)
(52) U.S. Cl. ........ 137/202; 137/15.26; 137/43; 123/516; 123/518
(58) Field of Classification Search ............ 137/43, 137/202, 588, 15.26; 123/516, 518; 141/59
See application file for complete search history.

(56) References Cited

U.S. PATENT DOCUMENTS

| | | | | |
|---|---|---|---|---|
| 4,741,317 A | * | 5/1988 | Yost | 123/518 |
| 5,054,528 A | * | 10/1991 | Saitoh | 141/59 |
| 5,282,497 A | * | 2/1994 | Allison | 141/59 |
| 5,388,611 A | * | 2/1995 | Harris | 137/588 |
| 5,603,349 A | * | 2/1997 | Harris | 137/588 |
| 5,606,945 A | * | 3/1997 | Sealock | 137/597 |
| 5,630,445 A | * | 5/1997 | Horiuchi et al. | 141/59 |
| 5,813,434 A | * | 9/1998 | Horiuchi et al. | 137/587 |
| 5,870,997 A | * | 2/1999 | Mukai | 123/516 |
| 6,029,635 A | * | 2/2000 | Sekine et al. | 123/516 |
| 6,343,590 B1 | * | 2/2002 | Nagai et al. | 123/518 |
| 6,439,206 B1 | * | 8/2002 | Shimamura et al. | 123/516 |
| 6,516,835 B2 | * | 2/2003 | Enge | 141/59 |
| 6,675,779 B2 | * | 1/2004 | King et al. | 123/518 |
| 2002/0189707 A1 | | 12/2002 | Enge | |
| 2003/0230288 A1 | | 12/2003 | King et al. | |

FOREIGN PATENT DOCUMENTS

| | | |
|---|---|---|
| EP | 0 648 637 A1 | 4/1995 |
| EP | 0 714 800 | 6/1996 |
| EP | 0 790 144 A2 | 8/1997 |
| WO | WO 96/24792 | 8/1996 |

OTHER PUBLICATIONS

PCT Search Report, PCT PCT/IB2007/001519 search completed Sep. 20, 2007.

* cited by examiner

*Primary Examiner* — Stephen M Hepperle
*Assistant Examiner* — Craig Price
(74) *Attorney, Agent, or Firm* — Dykema Gossett PLLC

(57) ABSTRACT

An on-board refueling vapor recovery system includes a shut-off mechanism that closes a first vapor path between the fuel tank and the filler cup when liquid fuel in the tank reaches a predetermined level and a vent line closure that closes a second vapor path between the canister and the filler cup, wherein closure of the first vapor path and the second vapor path reduces pressure in the filler cup to induce shutoff of a fuel nozzle.

4 Claims, 4 Drawing Sheets

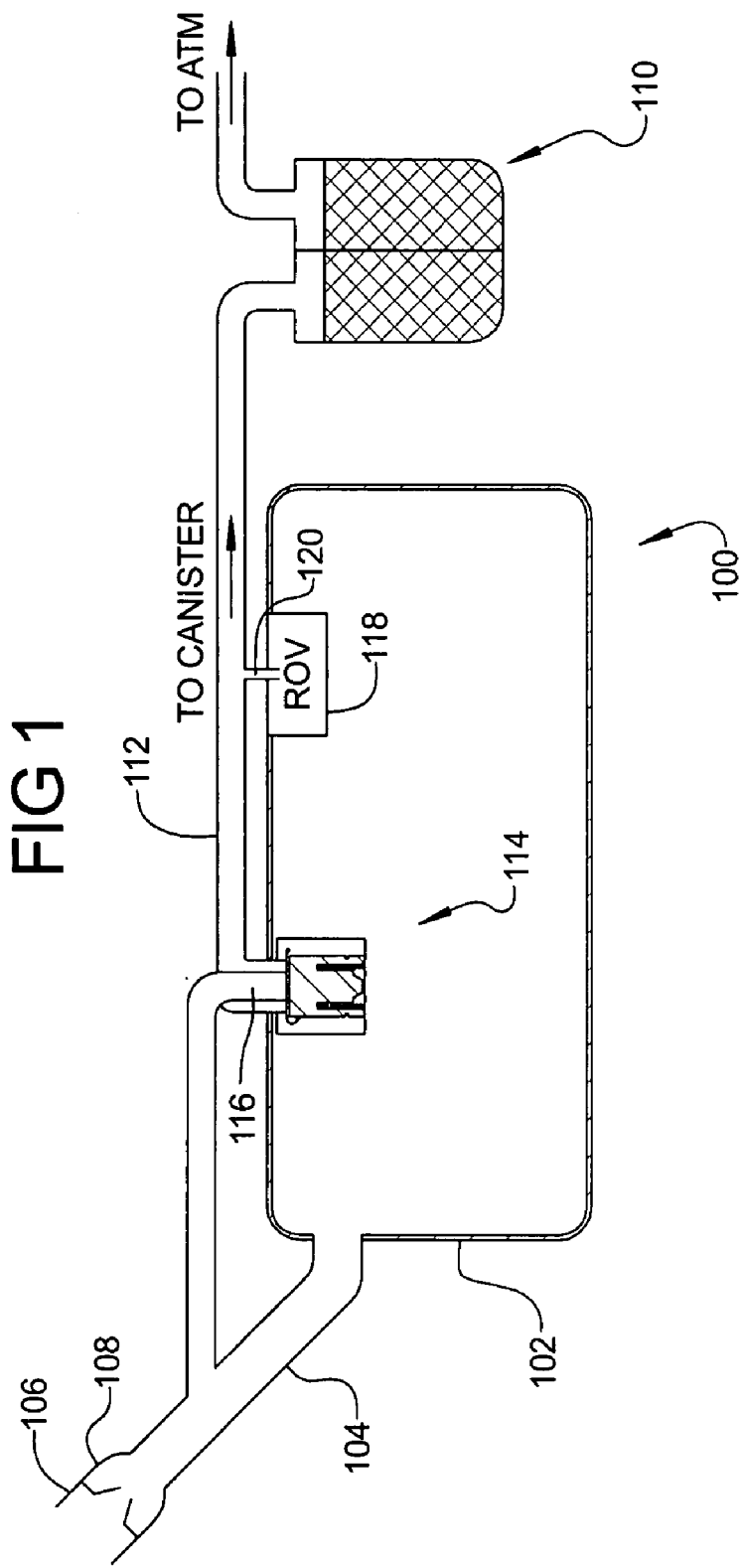

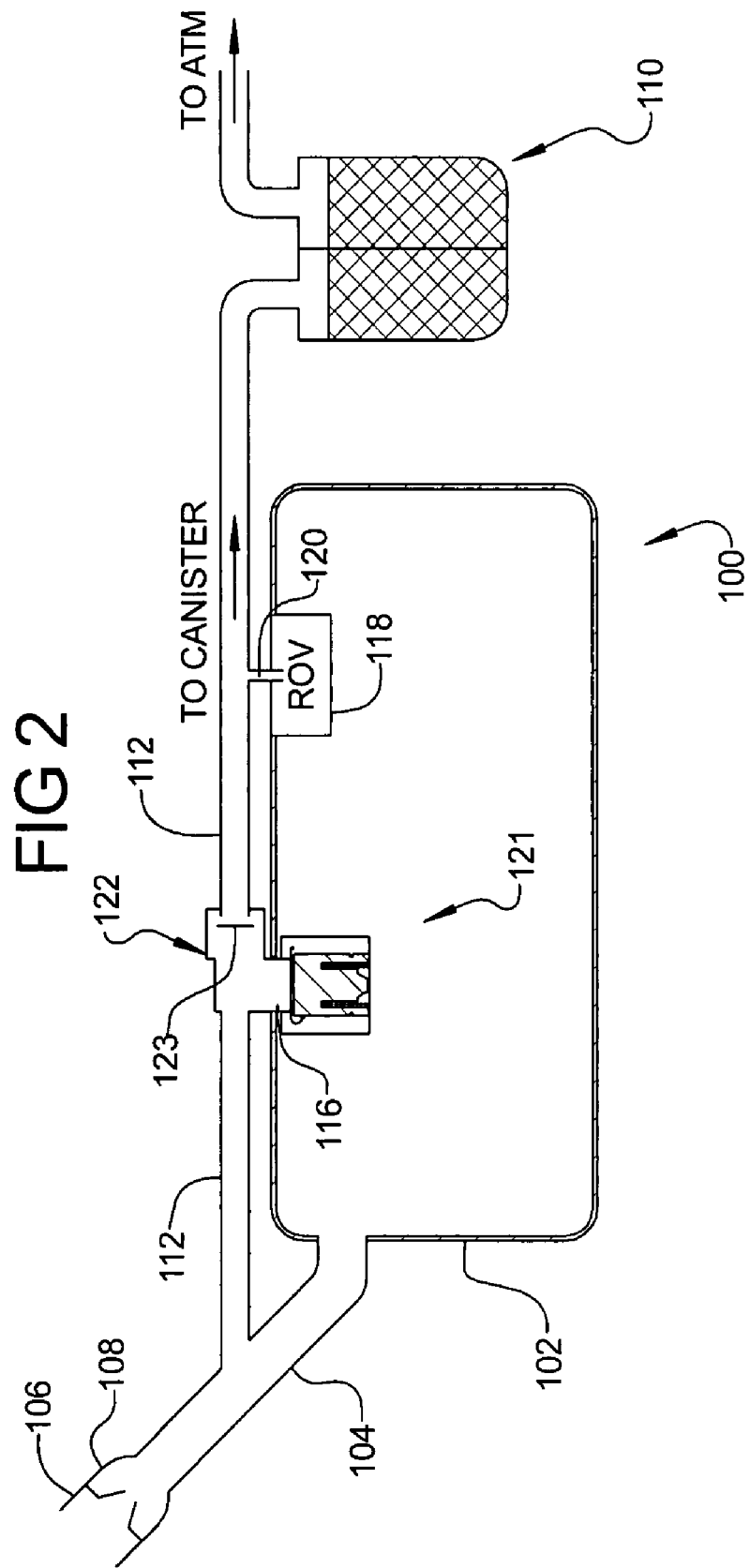

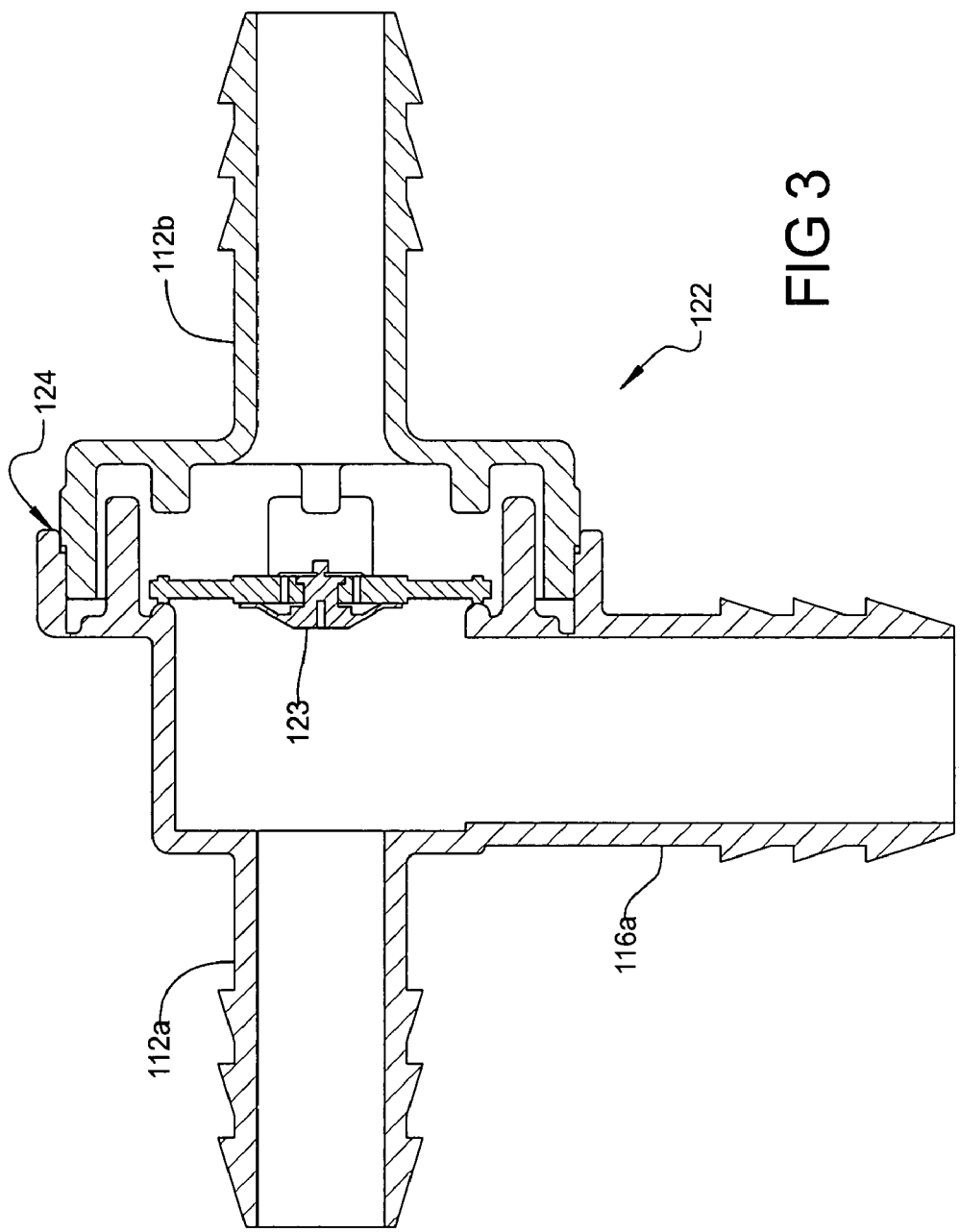

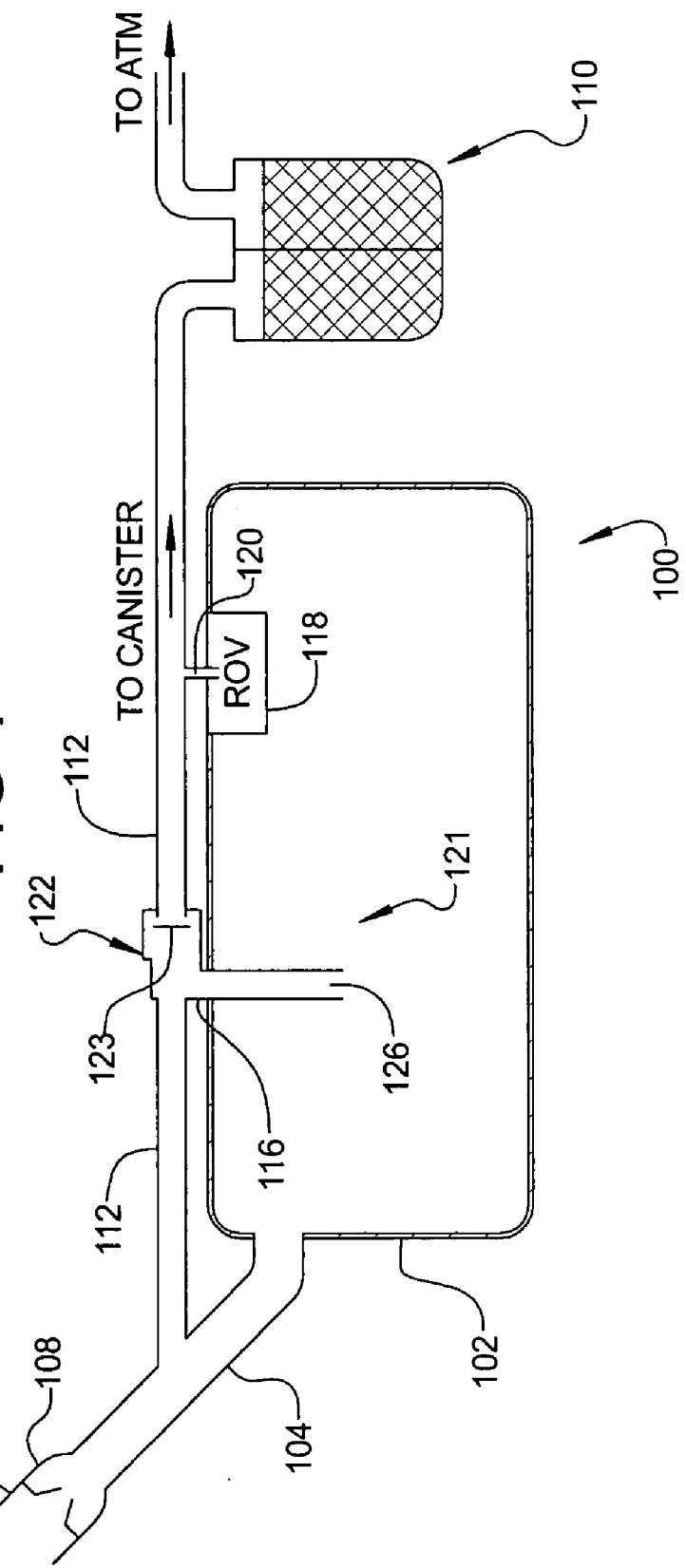

ON-BOARD REFUELING VAPOR RECOVERY SYSTEM WITH VENT LINE CHECK VALVE

REFERENCE TO RELATED APPLICATIONS

This application claims the benefit of U.S. Provisional Application 60/811,512, filed on Jun. 7, 2006, the disclosure of which is incorporated herein by reference.

TECHNICAL FIELD

The present invention relates to on-board refueling vapor recovery (ORVR) systems.

BACKGROUND OF THE INVENTION

Recently mandated vapor emission requirements for motor vehicle fuel tank systems have required that the system seal about the dispensing nozzle to prevent escape of fuel vapor to the atmosphere during refueling and such systems are often referred to as On-Board Refueling Vapor Recovery (ORVR) Systems. When a seal is disposed about the refueling nozzle, it is necessary to recirculate fuel vapor to a filler cup at the upper end of the filler tube in the region surrounding the nozzle in order to prevent the aspiration effect of nozzle discharge from causing premature activation of the vacuum sensitive shutoff mechanism provided in the dispensing nozzle. There is a desire for a system that quickly starves the nozzle of fuel vapor to ensure crisp operation of the shutoff mechanism.

SUMMARY OF THE INVENTION

The invention is generally directed to an on-board refueling vapor recovery system having a fuel tank, a canister to capture fuel vapor, a filler cup, a vent line connecting the canister and the filler cup, a shutoff mechanism that closes a first vapor path between the fuel tank and the filler cup when liquid fuel in the tank reaches a predetermined level, and a vent line closure that closes a second vapor path between the canister and the filler cup, wherein closure of the first vapor path and the second vapor path reduces pressure in the filler cup to induce shutoff of a fuel nozzle.

The invention is also directed to a method of restricting vapor flow in an on-board refueling vapor recovery system with a fuel tank, a canister, a filler cup, and a vent line connecting the canister and the filler cup. The method includes closing a first vapor path between the fuel tank and the filler cup when liquid fuel in the tank reaches a predetermined level; and closing a second vapor path between the fuel tank and the filler cup, wherein closure of the first vapor path and the second vapor path reduces pressure in the filler cup to induce shutoff of a fuel nozzle.

BRIEF DESCRIPTION OF THE DRAWINGS

FIG. 1 is a representative section view of a fuel system according to one embodiment of the invention;

FIG. 2 is a representative section view of another embodiment of the invention;

FIG. 3 is a section view of a check valve that may be used in an embodiment of the invention; and FIG. 4 is a representative section view of yet another embodiment of the invention.

DESCRIPTION OF THE EMBODIMENTS

FIG. 1 shows one embodiment of a fuel system 100 designed to induce quick nozzle shutoff when the fuel in a fuel tank 102 reaches a full level. The system 100 includes a filler tube 104 having an enlarged filler cup area 106 designed to accommodate a filler tube (not shown). A mechanical seal 108 is disposed in the filler cup 106 to form a seal around the nozzle during refueling.

The fuel system 100 also includes a canister 110 that can store excess fuel vapor. In one embodiment, the canister 110 contains charcoal as a fuel vapor adsorbent. A main vent line 112 couples the canister 110 with the filler cup 106 so that vapor can flow between the two. A shutoff mechanism 114 is disposed in the fuel tank 102 and is connected to the main vent line 112 in a substantially T-shaped configuration.

FIG. 1 shows one embodiment where the shutoff mechanism is a double shutoff fuel limit vent valve (FLVV) 114. The FLVV 114 is positioned to close when the fuel tank is full, stopping vapor flow from the fuel tank 102 through the FLVV 114 into the filler cup 106. As shown in FIG. 1, a recirculation line 116 connects the FLVV 114 to the main vent line 112. The recirculation line 116 itself can either part of the FLVV 114 itself, as shown in this embodiment, or be a separate tube as shown in FIG. 2. An optional rollover valve (ROV) 118 may also be disposed in the tank 102 and connected to the canister 110 via a ROV line 120, which feeds into the main vent line 112.

To close the vapor path between the canister 110 and the filler cup 106, a vent line closure may be disposed to selectively close the vapor path formed by the main vent line 112. The embodiment in FIG. 1 shows on configuration where the FLVV 114 also acts as the vent line valve by closing the vapor path to the canister 110 at substantially the same time that it closes the vapor path to the filler cup 106. In other words, the FLVV 114 shuts off both the vapor path to the canister 110 and the vapor path to the filler cup 106 substantially simultaneously. One type of valve that may be used is a double-shutoff valve, such as the valve described in commonly owned, co-pending U.S. patent application Ser. No. 11/706,047, the disclosure of which is incorporated herein by reference in its entirety.

When the fuel in the tank 102 reaches a full level, the FLVV 114 rises to close both the recirculation line 116 and the main vent line 112. Closing the recirculation line 116 prevents vapor from flowing from the tank 102 to the filler cup 106, while closing the main vent line 112 prevents vapor from flowing from the canister 110 to the filler cup 106. Closing these two paths creates a quick pressure drop within the filler cup 106 due to the lack of vapor flow, creating a vacuum around the filler nozzle that induces nozzle shutoff. Quickly blocking vapor flow to the filler cup 106 ensures that the nozzle shutoff is caused by the pressure drop in the filler cup 106 and not by, for example, liquid fuel backing up the filler tube 104 due to high pressure in the fuel tank 102.

FIG. 2 shows another embodiment of the invention. In this embodiment, the recirculation line 116 is a tube that is closed by a single shutoff FLVV 121 when the fuel in the tank reaches a full level. A check valve 122 is disposed at the junction between the main vent line 112 and the recirculation line 116 between the fuel tank and the charcoal canister. In one embodiment, the check valve 122 is a low back pressure check valve that closes if there is a pressure differential across the valve 112. The check valve member 123 can be any appropriate closure component, such as an umbrella valve. FIG. 3 shows one embodiment of the check valve 122, which in this case is arranged at a joint 124 connecting two tubes 112a, 112b that form part of the main vent line 112. A third tube 116a at the joint 124 is disposed in a substantially T-shape to form part of the recirculation line 116.

During refueling (i.e., when the fuel in the tank 102 is below a full level), the FLVV 114 and the check valve 122 are both open, allowing fuel vapor to circulate between the tank 102, the canister 110, and the filler cup 106 through the main vent line 112 and the recirculation line 116. When the fuel level reaches a level that causes the FLVV 114 to close and block vapor flow through the recirculation line 116, the resulting pressure differential in the vent line 112 across the check valve 122 causes the check valve 122 to close, stopping vapor flow between the canister 110 and the filler cup 106.

FIG. 4 shows yet another possible embodiment where the shutoff mechanism has a dip tube configuration, wherein an end 126 of the recirculation line 116 is positioned so that liquid fuel in the tank will close the end 126 when it rises to a full level. When the end 126 is closed, it effectively stops vapor from flowing from the tank 102 to the filler cup 106. The resulting pressure differential across the check valve 122 in this embodiment causes it to close and block the vapor path between the canister 110 and the filler cup 106 in the manner described above.

Placing the check valve 122 in the vent line between the fuel tank and the canister blocks vapor flow from the canister to the refueling cup when vapor is blocked through the recirculation line, causing the refueling nozzle to shut off crisply. The check valve also prevents pressurization of the fuel tank when the nozzle is shut off because the pressure drop inducing the nozzle shutoff is due to lack of vapor flow in the refueling cup, not liquid fuel backing up the filler pipe due to increased tank pressure.

What is claimed is:

1. An on-board refueling vapor recovery system, comprising:
    a fuel tank;
    a canister;
    a filler cup having a mechanical seal disposed therein forming a seal around a filler nozzle during refueling;
    a rollover valve;
    a vent line connecting the canister and the filler cup;
    a shutoff mechanism that closes a first vapor path between the fuel tank and the filler cup when liquid fuel in the tank reaches a predetermined level and that
    closes a second vapor path between the canister and the filler cup, wherein vapor flows in an unrestricted manner from the tank to the filler cup along the first vapor path during refueling to recirculate the vapor,
    wherein vapor flows from the canister to the filler cup along the second vapor path during refueling,
    wherein closure of the first vapor path and the second vapor path reduces pressure in the filler cup to create a vacuum force below the mechanical seal and induce shutoff of a fuel nozzle, and
    wherein the shutoff mechanism closes the first vapor path and the second vapor path substantially simultaneously.

2. The system of claim 1, wherein a double shutoff fuel limit vent valve acts as the shutoff mechanism by closing both the first vapor path and the second vapor path.

3. The system of claim 1, wherein the shutoff mechanism is a fuel limit vent valve.

4. A method of restricting vapor flow in an on-board refueling vapor recovery system with a fuel tank, a canister, a filler cup having a mechanical seal disposed therein forming a seal around a filler nozzle during refueling, a rollover valve, and a vent line connecting the canister and the filler cup, the method comprising:
    closing a first vapor path between the fuel tank and the filler cup when liquid fuel in the tank reaches a predetermined level; and
    closing a second vapor path between the canister and the filler cup, wherein closure of the first vapor path and the second vapor path reduces pressure in the filler cup to create a vacuum force below the mechanical seal and induce shutoff of a fuel nozzle;
    wherein vapor flows in an unrestricted manner from the tank to the filler cup along the first vapor path during refueling to recirculate the vapor,
    wherein vapor flows from the canister to the filler cup along the second vapor path during refueling,
    wherein the first vapor path and the second vapor path are closed substantially simultaneously.

* * * * *